United States Patent [19]

Anderson et al.

[11] Patent Number: 4,833,679
[45] Date of Patent: May 23, 1989

[54] METHOD AND APPARATUS WITH IMPROVED ERROR CORRECTION AND ERROR INFORMATION AVAILABILITY

[75] Inventors: Robert W. Anderson, Morgan Hill; Ralph L. Gee, San Jose; Jasper A. Indelicato, Manteca; Arvind M. Patel, San Jose, all of Calif.

[73] Assignee: International Business Machines Corporation, Armonk, N.Y.

[21] Appl. No.: 91,482

[22] Filed: Aug. 31, 1987

[51] Int. Cl.⁴ .............................................. G06F 11/10
[52] U.S. Cl. ........................................ 371/38; 371/39
[58] Field of Search ........................ 371/37, 38, 39, 40

[56] References Cited

U.S. PATENT DOCUMENTS

| | | | |
|---|---|---|---|
| 4,494,234 | 1/1985 | Patel | 371/38 |
| 4,504,948 | 3/1985 | Patel | 371/38 |
| 4,525,839 | 6/1985 | Nozawa et al. | 371/38 |
| 4,625,273 | 11/1986 | Woffinden et al. | 371/38 |
| 4,706,250 | 11/1987 | Patel | 371/38 |
| 4,733,396 | 3/1988 | Baldwin et al. | 371/38 |
| 4,745,604 | 5/1988 | Patel et al. | 371/38 |

FOREIGN PATENT DOCUMENTS 147794  7/1985  European Pat. Off. ............. 371/12

Primary Examiner—A. D. Pellinen
Assistant Examiner—Geoffrey S. Evans
Attorney, Agent, or Firm—Henry E. Otto, Jr.

[57] ABSTRACT

A method and apparatus is disclosed that is selectively conditionable, during read processing, to operate in normal or diagnostic on-the-fly mode or in normal or diagnostic deferred mode to correct errors in encoded uncorrected data in a disk storage device. During deferred mode operation, hardware in the disk storage device receives uncorrected data in real time and generates syndrome bytes which are decoded at the device into error pattern and error location information that is transmitted to a storage director. Circuitry is provided for retaining, if desired, error pattern and location information to facilitate identification of surface defects in the storage disk whether read processing was done on-the-fly or in deferred mode.

11 Claims, 2 Drawing Sheets

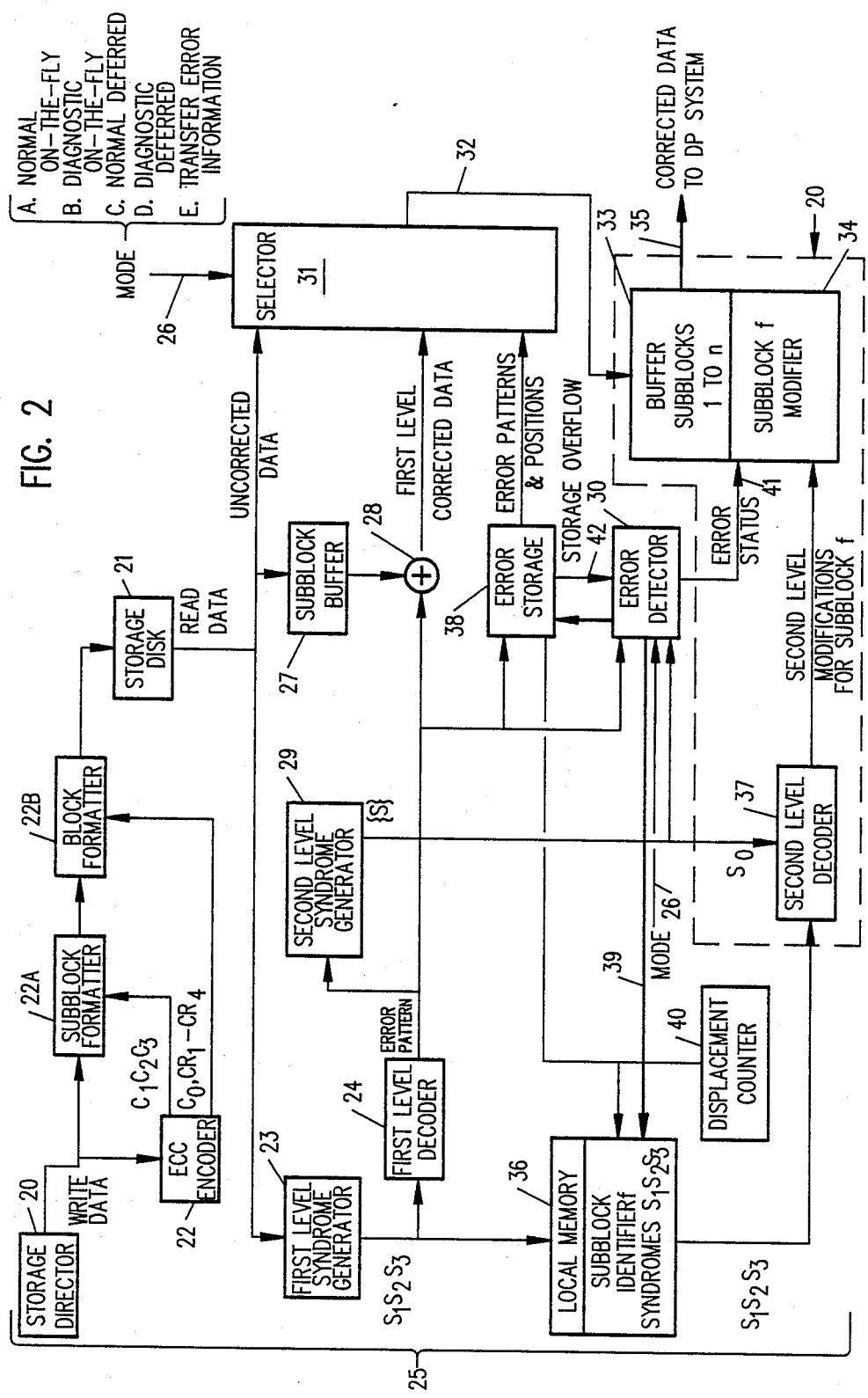

METHOD AND APPARATUS WITH IMPROVED ERROR CORRECTION AND ERROR INFORMATION AVAILABILITY

BACKGROUND OF THE INVENTION

1. Field of the Invention

This invention relates to a method and apparatus for correcting errors in encoded uncorrected data in a storage device using a multiple level error correction code (ECC) format, and more particularly to a method and apparatus wherein such errors are at least partially processed at the storage device during deferred mode operation in a synchronous environment, such as with Count-Key-Data (CKD) architecture, and error position information may be retained when operating in either on-the-fly mode or deferred mode.

2. Description of Background Art

It has heretofore been proposed, in conventional single level error correction systems, to pass uncorrected data to a storage director for error correction. Error pattern and error location information is decoded by software in the storage director, and there corrected by software.

In the copending application U.S. Ser. No. 781,449, filed Sept. 27, 1985 (now U.S. Pat. No. 4,706,250, granted Nov. 10, 1987) assigned to the assignee of the present invention, there is disclosed a two-level error correction code structure in an improved multi-byte error-correcting subsystem. Data is formatted on a disk track into a number of subblocks, each within a respective block. There are also two sets of three subblock check bytes. One set is associated with the even phases and the other with the odd phases, thus providing interleaved codewords. With this arrangement, the first level of correction (of subblock errors) is done on-the-fly at the storage device after being delayed one subblock, and the data is sent to the storage director for correction of any second level (block) errors. On-the-fly error correction thus has advantages, including the fact that the next field can be processed without loss of disk synchronization. However, this on-the-fly correction is suitable only for systems operating in an asynchronous environment. It is not as desirable for operating systems which require a synchronous environment (such as with the CKD format) because there is insufficient time to communicate the next operation and no assurance that errors will be corrected within the allowed gap. Also, when operating in on-the-fly mode, first level (subblock) corrected data is passed to the storage director, but no error pattern and location information is retained.

It has heretofore been proposed to implement error correction by use of software in deferred mode operation to decode and also correct single level errors, or to decode and correct first level errors in a multilevel ECC format. When this is done, processing time increases in direct proportion to the number of errors present in a block. Also, when error decoding and correction are implemented with software, and a multibit error crosses byte boundaries, it is not possible to determine whether the two bytes in error are adjacent until processing is completed, thus always requiring two correction cycles.

There is a need for an improved apparatus and method using a two-level code structure which more efficiently permits correction of multibyte errors in a synchronous or asynchronous operating system environment and permits retention of error pattern and location information whether operating in a deferred or on-the-fly mode.

SUMMARY OF THE INVENTION

Toward this end and according to the invention, in CKD synchronous operation of the disk storage device, uncorrected data is sent to a storage director in synchronism with the read operation. The syndromes of error are concurrently computed in the storage device so that at the end of each record, a syndrome check is made to confirm the presence or absence of any errors. Any correction of errors, if needed, is done later by sending error information in a deferred mode.

The error information corresponding to the first-level errors in two-level ECC may be sent in the form of error pattern and location information for each error decoded in the storage device. The means for transferring such error information requires sufficient buffer space in the storage device (to hold the information) and a protocol for the transfer of up to a predetermined number of additional bytes at the end of each record from the storage device to the storage director (and/or to a host processing unit, if necessary).

Assume the variable length record contains large numbers of subblocks with interleaved codewords, having the first-level capability for correction of $t_1$ errors in each of the primary codewords in each of the subblocks. There is no need for providing space for all these errors since all will not be present simultaneously. In fact, only a few will be present at any one time and most of the subblocks will be error free. In the implementation, according to our invention, the number of subblocks with first level errors will be limited to k, where the largest value of k will be determined by hardware and architectural cost constraints. Byte in error will be identified along with error information. Error-free subblocks, the vast majority, will not be involved in the transfer of this error information.

Thus, deferred mode correction of two-level ECC is made practical and cost effective by the method herein disclosed and claimed even in a CKD environment of variable-length long records.

When the first-level errors are hardware decoded in the storage device, the decoder is also capable of correcting the errors on-the-fly in a buffered copy of the primary codeword as it is processed. The hardware decoder is an available option that provides other benefits. In particular, it eliminates the time required for syndrome processing in the control unit and also provides the error patterns to a Cyclic Redundancy Check (CRC) syndrome generator in order to preadjust them for first-level errors.

More specifically, according to the invention, a method and apparatus is provided that is selectively conditionable, during mode or in normal or diagnostic deferred mode. During deferred mode operation, hardware in the disk storage device receives uncorrected data in real time and generates syndrome bytes which are decoded at the device into error pattern and error location information that is transmitted to the storage director. Irrespective of the number of first level (subblock) errors, the amount of time to process them is substantially constant. There is at least one revolution delay to resynchronize with the storage disk. However, since the pattern and location of first level errors is determined at the storage device, the storage director is partially relieved of the ECC processing and is thus able to perform other tasks. Also, means are provided for retaining, if desired, error pattern and location information to facilitate identification of surface defects in the storage disk whether read processing was done on-the-fly or in deferred mode.

BRIEF DESCRIPTION OF THE DRAWINGS

FIG. 2 is a block diagram of the first and second level correcting portions of an ECC apparatus according to one embodiment of the invention showing the devices resident in the storage device and in the storage director, said apparatus being selectively conditionable for read processing with deferred mode error correction or on-the-fly operation and with or without storage of error pattern and location information for identification of surface defects in the storage device.

DESCRIPTION OF PREFERRED EMBODIMENT

Figure 1:
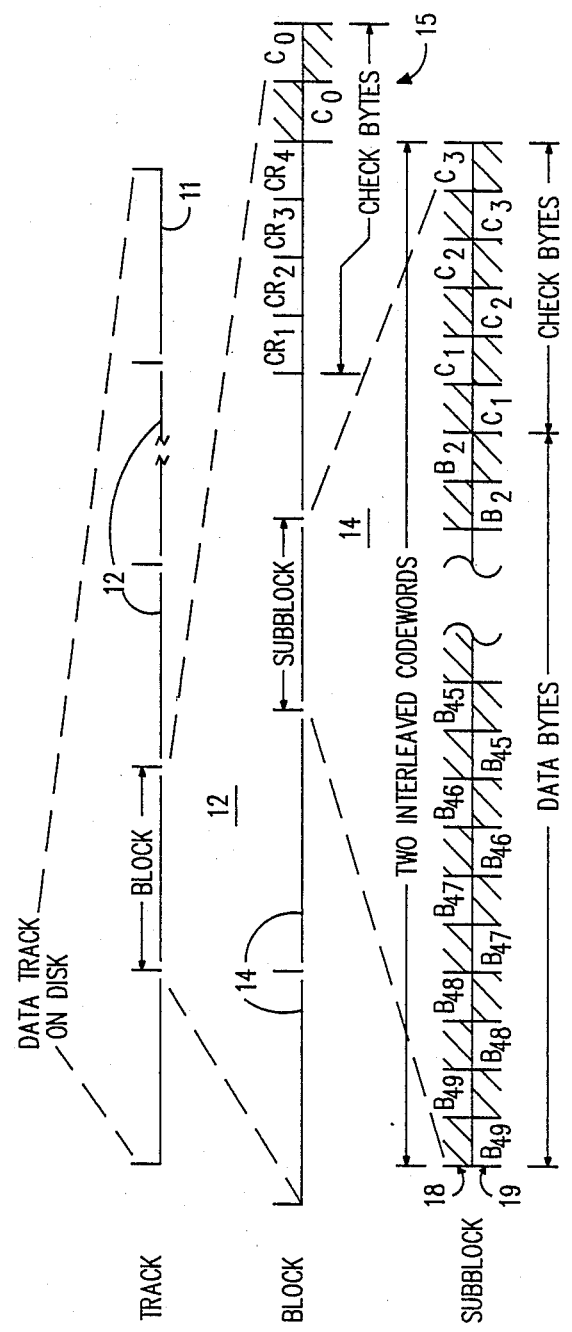
FIG. 1 illustrates a data format of a disk track that embodies a two-level code structure used in connection with the present invention.

Initially, it is desirable more specifically to explain the inventive concept. The basic two-level ECC scheme, as described in the aforementioned application U.S. Ser. No. 781,449, has n subblocks in a block with N bytes in each subblock. The capability at the first level of decoding provides correction of up to $t_1$ errors in all subblocks. The capability at the second level of decoding provides correction of $(t_1+x)$ errors in one subblock and $(t_1+c-x)$ errors in all other subblocks in a block.

The basic error event is a "bytes in error". A burst error may cause correlated errors in adjacent bytes; however, sufficient interleaving is assumed to effectively randomize these errors. With appropriate interleaving, all bytes are assumed equally likely to be in error as seen by the ECC scheme.

The probability p of the basic error event is known. The probability of any combination of multiple errors in a subblock and a block is then calculated using binomial and multinomial expressions. The total probability of no-error and correctable-error combinations at the first level of decoding is obtained which then leads to the uncorrectable (or miscorrected) error rate at the first level. Similarly, the total probability of no-error or correctable-error combinations at the second level of decoding is obtained which leads to the uncorrected (or miscorrected) error rate at the second level.

For example, assume that:
p = probability that a byte is in error; and
$p_{sb}(x)$ = probability that x bytes are in error in a subblock of N bytes—then $$p_{sb}(x) = \binom{N}{x} p^x (1-p)^{N-x}$$

For the First Level of Error Correction

For CASE I, with $t_1=1$ and n subblocks in a block, $P_b(\leq 1)$ denotes the probability of up to one (1) error in each subblock of a block. Then $$P_b(\leq 1) = \sum_{i=0}^{n} \binom{n}{i} [P_{sb}(1)]^i [p_{sb}(0)]^{n-i} = [P_{sb}(0) + P_{sn}(1)]^n$$

In CASE I, correction is allowed in all n subblocks, and thus not limited.

For CASE II, with $t_1=1$ and n subblocks in a block, $P_{bk}(\leq 1)$ denotes the probability of up to one (1) error in up to k subblocks and zero (0) errors in all others. Then $$P_{bk}(\leq 1) = \sum_{i=0}^{k} \binom{n}{i} [P_{sb}(1)]^i [P_{sb}(0)]^{n-i}$$

In CASE II, correction is limited to k subblocks, where k<n.

For the Second Level of Error Correction

For CASE I with $t_2=2$, $t_1=1$, $c=1$, $P_b(2,1)$ denotes the probability of two (2) errors in one subblock and up to one (1) error in all others. Then $$P_b(2,1) = \binom{n}{1} P_{sb}(2) [P_{sb}(1) + P_{sb}(0)]^{n-1}$$

Again, in CASE I, correction is allowed in all n subblocks, and thus not limited.

For CASE II with $t_2=2$, $t_1=1$, and $c=1$, $P_{bk}(2,1)$ denotes the probability of two (2) errors in one subblock and up to one (1) error in k−1 subblocks, then $$P_{bk}(2,1) = \binom{n}{1} P_{sb}(2) \sum_{i=0}^{k-1} \binom{n-1}{i} [P_{sb}(1)]^i [P_{sb}(0)]^{n-i-1}$$

In CASE II, correction is limited to k subblocks. As used herein and in the claims, it is desirable to preselect a value of $k \geq k_0$, where $k_0$ is defined as the smallest value of k for which error probabilities $P_{bk}(\leq 1)$ and $P_{bk}(2,1)$ with the k limitation are close to those without the k limitation; namely, $P_b \leq 1$ and $P_b(2,1)$, respectively.

FIG. 1 illustrates the data format of a disk track that embodies a two-level code structure implementing the present invention. As illustrated, data is recorded along a track 11, formatted into a plurality of fixed or variable length blocks 12. Each block 12 is divided into fixed length subblocks 14. As illustrated, each subblock 14 comprises two interleaved codewords 18,19. Each codeword 18,19 comprises 48 data byte positions and three subblock check bytes $C_1, C_2, C_3$. Each block 12 thus comprises subblocks, each having 96 (two pairs of 48) data byte positions and three pairs of subblock check bytes $C_1$, $C_2$, and $C_3$. In addition, four check bytes $CR_1$-$CR_4$ for data integrity checking after ECC correction and two check bytes $C_0$ for second level error correction are appended to the end of each block 12 in a block check byte are 15. The manner in which the error correction check bytes $C_1$-$C_3$ in each subblock 12 and check bytes $CR_1$-$CR_4$ and $C_0$ at the end of each block 12 are determined and produced forms no part of the present invention. The reader is referred to the aforementioned application, U.S. Ser. No. 781,449 for a detailed explanation.

As illustrated, the ECC system will correct one 25-bit error event or two nine-bit error events in one of the subblocks and up to one nine-bit error event in any or all remaining subblocks in the block. An error event is defined as a set of incorrect bit values that span a number of bits. An error in terms of the error correction code is defined as any pattern of eight bits in one byte position of the block which is not the correct pattern. Since the lengths of error events vary and the codewords are interleaved, various combinations of errors can b corrected.

Referring now to FIG. 2, data from a data processing system (not shown) is sent via a control unit or storage director 20 to storage disk 21 for writing on a track which is formatted as shown in FIG. 1. In the writing and transfer of this data, three sets of check bytes $C_1$, $C_2$ and $C_3$ ar developed for each subblock by an ECC encoder 22. Block check byte $C_0$ is also developed by encoder 22. A subblock formatter 22A appends check bytes $C_1$, $C_2$ and $C_3$ to each corresponding subblock. A block formatter 22B appends block check byte $C_0$ (as well as data integrity check bytes, $CR_1$–$CR_4$) at the end of the block. The formatted data is then recorded on storage disk 21.

In the readback process, the read data are checked by coding equations (1), (2), (4) and (5) in the aforementioned application in order to develop the syndromes of error in the conventional manner. Subblock check bytes $C_1$, $C_2$ and $C_3$ are associated with syndromes $S_1$, $S_2$ and $S_3$, while block-level check byte $C_0$ is associated with the $S_0$ syndrome byte.

The subscript numbers assigned to the syndromes, e.g., $S_0$, $S_1$, etc., are related to the particular T matrix employed to generate the respective check characters. Specifically, $S_0$, which is developed from $C_0$, corresponds to a conventional parity check byte. $S_3$, on the other hand, is developed from $C_3$ which is generated in accordance with logic that involves multiplying the input byte by a matrix $T^3$. Syndromes $S_1$ and $S_2$, which correspond to check bytes $C_1$ and $C_2$, respectively, are similarly generated, using logic which involves matrices $T^1$ and $T^2$, respectively. Such logic for syndrome generation is well known and forms no part of the present invention.

During the readback process, uncorrected data is read from disk 21 to a first level syndrome generator 23 which generates syndrome bytes for $S_1, S_2, S_3$ for each codeword of a subblock. These syndrome bytes are transmitted to a first level decoder 24 for decoding into error pattern data. This represents the first level ECC function of correcting a single byte error in each of the two interleaved words 18,19. From this point on, ECC processing will differ according to the type of operation specified by the storage director 20 at the beginning of the readback from disk 21. This specified type of operation is translated by circuitry (not shown) in the storage device 25 into one of four ECC command sequences or modes A,B,C,D and transfer error information command E. The ECC mode is selected by a command from storage director 20 on a mode bus 26 which controls the data path According to the invention, the four ECC modes of read processing are: (A) Normal on-the-fly; (B) Diagnostic on-the-fly; (C) Normal deferred; and (D) Diagnostic deferred.

A. Normal On-the-fly Read Processing

When operating in this mode, a block of data is also read from disk 21 and stored in a first-in-first-out (FIFO) buffer 27 by subblocks. After a delay time corresponding to the time necessary to read out a subblock, the uncorrected data stored in buffer 27 is exclusive OR'd a 28 with the error pattern data from decoder 24 and passed to a selector 31. If syndromes $S_1$, $S_2$ and $S_3$ for each codeword of the subblock are all zeros, then an error detector 30 will determine no error has occurred.

(i) If all subblocks are error free, a second level syndrome generator 29 which generates second level syndromes (and also data integrity syndromes for check bytes $CR_1$–$CR_4$), and error detector 30 will determine that the block is error-free. Hence, no error indication will come up in an error status line 41. As a result, the selector 31 will cause the block to be sent via a bus 32 to a subblock buffer 33 in storage director 20 and via a bus 35 to the data processing system.

(ii) Assume now that all subblocks are not error-free but that, in the example illustrated, there is not more than one error per subblock. In such case, the first level errors will be corrected at the exclusive OR gate 28 and the first level corrected data passed on via selector 31, bus 32, subblock buffer 33, and bus 35 to the data processing system. Error detector 30 will determine from the second level syndrome generator 29 that the block, as corrected, is error free; and hence no error indication will come up in line 41.

If the error condition is not as stated in (i) or (ii) above, the correction must be made at the block level.

Syndromes $S_1$, $S_2$, $S_3$ associated with a particular subblock codeword are held in a local memory 36. They are retained for further processing at the block level if that particular subblock's syndromes were not all zeros and no nonzero error pattern was generated by the first level decoder 24. Local memory 36 also retains the identification of an uncorrected subblock as subblock identifier "f". At the end of the block, the second level check syndrome, $S_0$, from a second level syndrome generator 29 and the first level syndromes $S_1$, $S_2$, $S_3$ for subblock f from local memory 36 are processed by the second level decoder 31 to correct two errors in subblock f.

The portion of the subsystem which functions to correct the multibyte error in one subblock by processing four syndrome bytes corresponding to the four check bytes $C_0$, $C_1$, $C_2$ and $C_3$ can be identical to the "on-the-fly" correction subsystem described in U.S. Pat. No. 4,494,234, assigned to the assignee of the present invention. The specific details of the logic or the detailed steps involved in correcting a two-byte error in a subblock by processing the four syndrome bytes form no part of the present invention, but are available in the above-referenced patent. Other prior art arrangements for correcting two errors in a word by processing four related syndrome bytes may, of course, be employed.

B. Diagnostic On-the-fly Read Processing

To operate in this mode, bus 26 will be conditioned by a suitable command from storage director 20. Operation will be the same a above described for normal on-the-fly processing except that logic in error detector 30 will indicate at the end of the block whenever a first level error is detected in either customer data, subblock check bytes or block check bytes. First level error pattern information is stored in error storage 38 at the time error pattern information is exclusive OR'd at 28 with the uncorrected data. At the end of the block, storage director 20 requests the error information from the storage device 25 by conditioning bus 26 with the transfer error information command E. This error information is passed via selector 31 and bus 32 to storage director 20.

This is desirable because it allows the storage director 20 to identify the location of first level errors that are hidden when operating in normal on-the-fly mode described in Section A above. The error information can be used to identify surface defects in storage disk 21 during initial testing, or when screening tracks suspected to have developed defects after initial testing, or when a particular storage disk is producing a higher than normal error rate.

Note that in either type of on-the-fly operation, uncorrected data is not transmitted via selector 31 to storage director 20.

C. Normal Deferred Mode Read Processing

With bus 26 conditioned by storage director 20 to operate in this mode, uncorrected data is transmitted via selector 31 to subblock buffer 33 in storage director 20 as it is received from storage disk 21. Single byte errors in customer data of a particular subblock are identified as described in Section A hereof by the first level syndrome generator 23 and decoder 24 with error pattern and position information being stored in error storage 38. First level error patterns are also used by the second level syndrome generator 29 in calculating second level syndromes, assuring that the second level syndromes reflect corrected first level data. At the end of the block, error detector 30 indicates whether an error was present in the data. If first level errors were present, storage director 20 conditions bus 26 with the transfer error information command. This causes selector 31 to gate the contents of error storage 38 to storage director 20 via bus 32. Logic in the subblock modifier 34 of storage director 20 exclusive OR's the error patterns with the uncorrected data 33. The corrected data is then transmitted to the data processing system via bus 35.

If at the end of a subblock where not all the subblock syndromes ($S_1$, $S_2$ and $S_3$) generated by the first level syndrome generator 23 are zero, and the error patterns from first level decoder 24 are zero, then error detector 30 recognizes that a non first level error is present in the block. A non first level error is treated by storage device 25 as a second level error. Displacement counter 40 runs continuously and is stored in local memory 36 at each subblock boundary. Likewise, the first level syndromes from the first level syndrome generator 23 are stored in local memory after each subblock. When error detector 30 identifies an error requiring second level processing, it inhibits the update of the displacement counter 40 and the subblock syndromes in local memory 36 thus assuring the subblock pointed to by the subblock identifier will indicate the subblock that requires second level processing. A the end of the block, error detector 30 indicates an error via a line 41. If second level errors were present, storage director 20 conditions bus 26 with the transfer error information command E. This causes local memory 36 and second level syndrome generator 29 to transmit the first and second level syndromes and the subblock identifier to the second level decoder 37 in storage director 20. Second level decoder 37 calculates the error pattern and position within the subblock for second level errors and transmits this information to subblock modifier logic 34 which exclusive OR's the error patterns with the uncorrected data in buffer 33. The corrected data is then transmitted to the data processing system via bus 35. In normal deferred read ar not part of customer data and need not be correct.

D. Diagnostic Deferred Mode Read Processing

When bus 26 is conditioned for this mode, operation is identical with that described in Section C hereof except that first level errors located in subblock or block check bytes also cause error detector 30 to send an error indication to storage director 20 via line 41 at the end of the block. The locations of check byte errors are stored in error storage 38 in addition to information relating to first level errors in customer data. This mode of operation is desirable when identifying defects in storage disk 21 as part of the initial analysis of the storage disk or when disk defects are suspected while operating in normal data processing environments.

Another error condition that may occur in the system is where one subblock contains more than two errors in a codeword and hence, is uncorrectable. This error condition is beyond the capability of the code illustrated in this embodiment. Hence, it may be miscorrected. Sometimes this will be indicated by second level decoder 37 when, as a result of processing the block-level syndrome bytes, the syndrome processing circuitry was unable to identify the location and/or error pattern of one or both errors. The data integrity checks $CR_1$–$CR_4$ will also detect such uncorrected or miscorrected errors.

While the preferred embodiment, as shown and described, assumed the two-level code structure in which a one-byte error in a codeword was correctable at the first level and a two-byte error in a codeword was correctable at the block level, it should be understood that the method and system may be modified to handle $t_1$ errors at the first codeword level and $t_2$ errors at the block level where $t_1$ is greater than one and $t_2 > t_1$.

It should be recognized in connection with the system just described that in order for the correcting process to work at the second level to correct two errors in a subblock codeword, it is necessary to identify which subblock contained two one-byte errors. In the system described, a subblock is identified by the nonzero subblock syndromes which, when processed by the first level syndrome processing circuits, indicate an uncorrectable error. If any other subblock provides nonzero syndromes, which causes the first level syndrome processing circuits to perform a single-error correction, this does not interfere with block-level correction of the one subblock with two errors. However, the block-level decode of this embodiment cannot correct three errors in one subblock codeword or two errors in two subblock codewords of the same phase.

Thus, where the block comprises four subblocks, each with two interleaved codewords, the system could correct up to eight one-byte errors, provided that each error was in a different codeword. Also, if one codeword in each phase contained two one-byte errors, then, for the system to correct these errors, all codewords in other subblocks in the block must be correctable by the first level decoder 24.

If the error storage 38 overflows, the error detector 30 will indicate in a line 42 an uncorrectable condition.

The outputs of first level decoder 24 and displacement counter 40 are illustrated as busses that may, for example, be two bytes wide. If single byte busses are employed, then it is necessary to insert a serializing selector (not shown) in these outputs to the error storage 38 so that the error pattern information and displacement information can be gated into storage 38 sequentially. Also, if desired, by modification of selector 31 or adding a separate buffer, one buffer could be used to selectively perform the functions of buffer 27 and error storage 38 if operational mode B (diagnostic on-the-fly) is not desired.

By use of the two-way interleaved ECC code structure, single error events that cross byte boundaries can be treated as first level errors. Error events of this type (which are quite common) affect different ECC codewords, one in each interleave phase. The ECC hardware when conditioned for deferred mode C or D is able to determine that the bytes in error (one byte in each interleaved codeword) are actually adjacent to one another and identifies the bytes in error with a single displacement pointing to the first of the bytes in error. This reduces the amount of correction information for a single error event to a minimum (i.e., 4 bytes).

Also, this ECC configuration minimizes the first level error processing requirements of the storage director 20 (both in terms of function and processing time). The ECC hardware returns correction information for each error event so that storage director 20 can immediately apply the error patterns to the data without further processing of the ECC data. The block level syndromes have been adjusted for all first level error events and can be used directly if second level processing is necessary.

Without this level of function in the ECC hardware, each phase of an error event would have to be processed separately by the storage director and the block syndromes adjusted for each byte in error. In the case of multiple first level error events, the storage director will have to serially process each subblock phase with an error before second level processing can be performed.

While the invention has been shown and described with reference to preferred embodiments thereof, it will be understood by those skilled in the art that the foregoing and other changes in form and detail may be made therein without departing from the spirit, scope and teaching of the invention. Accordingly, the method and apparatus herein disclosed are to be considered merely as illustrative and the invention is to be limited only as specified in the claims.

We claim:

1. A method of correcting errors in encoded uncorrected data in a disk storage device operating in a synchronous environment with count-key-data format, employing a multiple level error correction code for use with records of varying length, said method comprising the steps of:
   formatting the data into blocks, each comprising subblocks, which except for possible the last, are of equal size, the number of subblocks in any record being determined by the length of that record;
   statistically determining, as a function of subblock size, first level correction capability and the length of the longest record anticipated, a number $k_0$ representing the minimum number of subblocks which may be in error and correctable;
   transmitting the uncorrected data to a storage director;
   performing only a portion of the decoding and correction of first level errors at the storage device; and
   only after all uncorrected data has been received by the storage director, transmitting error information reflecting first level error pattern and location to the storage director for completion of the first level of correction and performance of subsequent levels of correction.

2. A method according to claim 1, including the step of;
   storing subblock and block check byte error information as well as said first level error pattern and location information to facilitate identification of surface defects in a storage disk of the disk storage device.

3. A method according to claim 1, wherein k is $\geq k_0$, where $k_0$ is defined as the smallest value of k for which error probabilities $P_{bk}(\leq 1)$ and $P_{bk}(2,1)$ with the k limitation are close to those without the k limitation; namely, $P_b(\leq 1)$ and $P_b(2,1)$, respectively.

4. A method according to claim 3, wherein k represents the maximum number of subblock errors anticipated for a particular hardware environment.

5. For use with a multiple level error correction code format, apparatus for correcting errors in encoded uncorrected data in a disk storage device operative in a deferred mode to pass error correction information to a storage director, said apparatus comprising:
   syndrome generating means for receiving the uncorrected data and generating in the storage device first and second level syndromes therefrom;
   means, including decoder means, resident in the storage device, for decoding the syndromes to provide first and second level error pattern and location information;
   means, resident in the storage device, for adjusting the second level syndromes to reflect and retain the first level error pattern and location information; and
   means for transmitting said information to the storage director for completion of the first level of correction and performance of subsequent levels of correction.

6. Apparatus according to claim 5, including means comprising means for storing said error pattern and location information and means for storing subblock and block check byte error information to identify surface defects in a storage disk forming part of the disk storage device.

7. Apparatus according to claim 6, including detector means for signaling the storage director of an error event, for controlling gating of the flow of data within the storage device, and for identifying uncorrectable errors requiring retry.

8. A method of correcting errors in encoded uncorrected data in a disk storage device, using a multiple level error correction code formatted into a block containing a number of subblocks, said method comprising the steps of:
(a) selecting between deferred mode error correction or on-the-fly mode error correction; and
(b) during deferred mode operation:
   (i) transmitting the uncorrected data to a storage director and concurrently generating in the storage device first and second level syndromes from the uncorrected data,
   (ii) decoding the first level syndromes to provide first level error pattern and location information;
   (iii) adjusting the second level syndromes to reflect the first level error pattern and location information; and
   (iv) after all uncorrected data has been received by the storage director, transmitting said information to the storage director for completion of the first level of correction and performance o subsequent levels of correction; and (c) during on-the-fly mode operation:
  (i) transmitting the uncorrected data to a buffer and concurrently generating in the storage device first and second level syndromes from the uncorrected data;
  (ii) decoding the first level syndromes to provide error pattern information;
  (iii) adjusting the second level syndromes to reflect first level error pattern and location information;
  (iv) after a delay time corresponding to the time necessary to read out the next subblock, exclusive OR'ing the buffered uncorrected data with the first level error pattern information to provide data with the first level of error correction completed; and
  (v) transmitting the first level corrected data to the storage director for completion of subsequent levels of correction.

9. A method according to claim 8, including the further steps, during deferred mode operation, of:
  after performing steps b(i), (ii) and (iii) of claim 8, storing subblock and block check byte information as well as said first level pattern and displacement information to facilitate identification of surface defects in a storage disk of the disk storage device.

10. A method according to claim 8, including the further steps during on-the-fly operation, of:
  after performing steps c(i) (ii) and (iii) of claim 8, storing said first level error pattern and displacement information to facilitate identification of surface defects in a storage disk of the disk storage device.

11. For use with a two-level error correction code formatted into a block comprising a number of subblocks, apparatus for correcting errors in encoded uncorrected data in a disk storage device operatively connected to a storage director, said apparatus comprising:
  means for selectively conditioning the apparatus for deferred mode or on-the-fly error correction;
  means, including syndrome generating means and decoder means, resident in the storage device for decoding syndromes from the uncorrected data to provide error pattern and displacement information;
  means, resident in the storage device, for adjusting the second level syndromes to reflect the first level error pattern and displacement information;
  means operative when conditioned for deferred mode operation for transmitting said error pattern and displacement information to the storage director at the end of reading of the block for completion of the first level of correction and performance of the second level of correction;
  buffer means operative when conditioned for on-the-fly operation for storing the uncorrected data;
  means operative when conditioned for on-the-fly operation for exclusive OR'ing the buffered uncorrected data, after a delay time corresponding to the time necessary to read out the next subblock, with the error pattern information for outputting data with the first level of error correction completed; and
  means for transmitting the outputted data to the storage director for execution of the second level of correction.

* * * * *